United States Patent
Yoon

(10) Patent No.: US 12,415,301 B2
(45) Date of Patent: Sep. 16, 2025

(54) APPARATUS AND METHOD FOR MANUFACTURING SKIN-INTEGRATED INTERIOR MATERIALS

(71) Applicant: SEOYON E-HWA CO., LTD., Anyang (KR)

(72) Inventor: Chi Won Yoon, Cheonan (KR)

(73) Assignee: SEOYON E-HWA CO., LTD., Anyang (KR)

( * ) Notice: Subject to any disclaimer, the term of this patent is extended or adjusted under 35 U.S.C. 154(b) by 129 days.

(21) Appl. No.: 18/492,781

(22) Filed: Oct. 24, 2023

(65) Prior Publication Data
US 2024/0051200 A1 Feb. 15, 2024

(51) Int. Cl.
| | |
|---|---|
| B29C 45/66 | (2006.01) |
| B29C 45/14 | (2006.01) |
| B29C 45/26 | (2006.01) |
| B29C 45/36 | (2006.01) |
| B29C 45/42 | (2006.01) |
| B29L 31/30 | (2006.01) |

(52) U.S. Cl.
CPC .... B29C 45/14065 (2013.01); B29C 45/2602 (2013.01); B29C 45/2608 (2013.01); B29C 45/36 (2013.01); *B29C 2045/363* (2013.01); *B29L 2031/3005* (2013.01)

(58) Field of Classification Search
CPC ......... B29C 45/00; B29C 45/03; B29C 45/17; B29C 45/1742; B29C 45/26; B29C 45/28; B29C 45/52; B29C 45/522; B29C 45/5645
See application file for complete search history.

(56) References Cited

U.S. PATENT DOCUMENTS

| | | | |
|---|---|---|---|
| 6,261,501 B1* | 7/2001 | Miyagawa | B29C 45/14655 264/272.17 |
| 6,770,236 B2* | 8/2004 | Miyajima | B29C 45/34 264/102 |
| 2009/0168313 A1* | 7/2009 | Wei | B29C 45/1671 264/328.8 |
| 2010/0155992 A1* | 6/2010 | Kurashima | B29C 45/14655 264/272.14 |
| 2019/0011159 A1 | 1/2019 | Lee et al. | |
| 2019/0322024 A1* | 10/2019 | Yoon | B29C 45/14073 |

FOREIGN PATENT DOCUMENTS

| | | |
|---|---|---|
| KR | 10-2274392 B1 | 7/2021 |
| KR | 10-2377731 B1 | 3/2022 |

* cited by examiner

*Primary Examiner* — Thu Khanh T. Nguyen
(74) *Attorney, Agent, or Firm* — Harvest IP Law, LLP

(57) ABSTRACT

Proposed is an apparatus and method for manufacturing automotive interior materials. The apparatus includes a first mold unit provided with a first molding surface and a gate disposed on the first molding surface, wherein a skin is set on the first molding surface. The apparatus further includes a second mold unit provided with a second molding surface facing the first molding surface, and configured to provide an opening exposing an edge of an edge portion of the set skin along a periphery between the first molding surface and the second molding surface when the second mold unit is combined with the first mold unit, and a sealing block provided with a tip portion disposed along the opening when the first mold unit and the second mold unit are combined.

13 Claims, 12 Drawing Sheets

APPARATUS AND METHOD FOR MANUFACTURING SKIN-INTEGRATED INTERIOR MATERIALS

CROSS REFERENCE TO RELATED APPLICATION

The present application claims priority to Korean Patent Application No. 10-2022-0149944, filed Nov. 10, 2022, the entire contents of which is incorporated herein for all purposes by this reference.

TECHNICAL FIELD

The present disclosure relates to an apparatus and method for manufacturing automotive interior materials in which skins are integrated with base materials.

BACKGROUND OF THE INVENTION

Automotive interior materials include dashboards, door trims, glove boxes, etc.

In recent years, automotive interior materials have been manufactured in a form in which a hard base material is finished with a soft skin due to the increasing demand for high-quality products. Skins may express luxury through elaborate patterns, textures, or decorations on the surface.

Manufacturing of automotive interior materials composed of a base material and a skin may be carried out in the following order: obtaining a semi-finished product with a skin attached to a base material, and wrapping the peripheral portion of the base material in the obtained semi-finished product with the edge portion of the skin. Such automotive interior material manufacturing process has the following problems:

In the process of obtaining a semi-finished product, wrinkles may occur in the skin due to slight movement of the skin, pressure acting on the skin, etc.

In order to wrap the peripheral portion of the base material with the edge portion of the skin, trimming needs to be performed to remove the excess portion of the skin (i.e., the remaining part of the edge portion of the skin that wraps the peripheral portion of the base material) from the skin, and then the edge portion of the skin needs to be adhered to the peripheral portion of the base material. Thus, the overall process is inevitably complicated and difficult, and an increase in equipment and resulting cost increases cannot be avoided. Moreover, the use of adhesives may generate large amounts of environmental pollutants such as volatile organic compounds (VOCs).

Meanwhile, during the manufacturing process of automotive interior materials, high temperature and high pressure may be applied to skins, and the skins may be damaged by high temperature and pressure acting thereon. For example, a defect may occur where the skins become hard.

SUMMARY OF THE INVENTION

Accordingly, the present disclosure has been made keeping in mind the above problems occurring in the related art, and the present disclosure is intended to provide an apparatus and method for manufacturing automotive interior materials that are eco-friendly and advantageous in terms of productivity improvement.

An objective of the present disclosure is to provide an apparatus and method for manufacturing automotive interior materials that prevent defects such as wrinkles on skins.

Another objective of the present disclosure is to provide an apparatus and method for manufacturing automotive interior materials that are more advantageous in preventing damage to skins.

The objectives to be achieved are not limited to those mentioned above, and other objectives can be clearly understood by those skilled in the art from the following description.

In order to achieve the above objectives, according to an embodiment of the present disclosure, there is provided an apparatus for manufacturing automotive interior materials. The apparatus includes: a first mold unit provided with a first molding surface and a gate disposed on the first molding surface, wherein a skin is set on the first molding surface; a second mold unit provided with a second molding surface facing the first molding surface, and configured to provide an opening exposing an edge of an edge portion of the set skin along a periphery between the first molding surface and the second molding surface when the second mold unit is combined with the first mold unit; and a sealing block provided with a tip portion disposed along the opening when the first mold unit and the second mold unit are combined, wherein the tip portion may include: a pressurizing tip that presses the edge portion to bring the edge of the skin into full contact with the first molding surface; and a wrapping molding surface that closes the opening to form an enclosed molding space between the first molding surface and the second molding surface, wherein the enclosed molding space is configured to shape a molten resin injected through the gate into a base material, and integrate the base material with the skin; and the wrapping molding surface is configured to guide the skin to wrap a peripheral portion of the base material.

The sealing block may be provided in the first mold unit and composed of a plurality of unit blocks arranged around the first molding surface, wherein each of the plurality of unit blocks may be capable of moving back and forth with respect to an edge section of the first molding surface where the edge of the skin is positioned by a block drive module, thereby pressing the edge of the skin when moving forward and releasing pressure on the edge of the skin when moving backward.

The block drive module may include: a forward operation member capable of moving back and forth with respect to each of the plurality of unit blocks, and advancing each of the plurality of unit blocks toward the edge section by a tapered surface when moving forward; and a backward operation member providing elastic force in a backward direction to each of the plurality of unit blocks so as to move each of the plurality of unit blocks away from the edge section when the forward operation member moves backward.

The backward operation members may be composed of an elastic member interposed between each of the plurality of unit blocks and the first mold unit.

The first mold unit may include: a central mold and a peripheral mold coupled to each other to enable sliding back and forth with respect to the second mold unit; and a mold drive module that moves the central mold or the peripheral mold, wherein the central mold may provide a central portion of the first molding surface and have the gate, the peripheral mold may provide a peripheral portion of the first molding surface around the central mold, the mold drive module may switch a state of the central mold and the peripheral mold between a first state, in which the central mold and the peripheral mold are aligned to provide the first molding surface, and a second state, in which the central mold and the peripheral mold are misaligned to provide an injection space surrounded by the peripheral mold in front of the gate, and the central mold and the peripheral mold may be maintained in the second state when the molten resin is injected, and after an injection of the molten resin is completed, the central mold and the peripheral mold may be switched to the first state, reducing the injection space and compressing the injected molten resin in the injection space.

The second mold unit may include: a first split mold in which a core mold having the second molding surface is slidably coupled; a second split mold disposed behind the first split mold; a core mold rod with a first end thereof is connected to the core mold and a second end thereof is connected to the second split mold; and at least one pressure-reducing elastic member interposed between the first split mold and the second split mold, and retracting, in a state in which the first mold unit and the second mold unit are combined, the core mold by a core-back distance by which the second split mold is retracted from the first split mold. The molten resin may contain a forming agent.

The second mold unit may further include: a stop unit that limits a retraction distance of the second split mold with respect to the first split mold.

The stop unit may include at least one core-back suppression cylinder connected to the first split mold and the second split mold, and may be configured to limit the retraction distance of the second split mold with respect to the first split mold through adjustment of a movement distance of the core-back suppression cylinder.

The second split mold may include: a second front split mold disposed behind the first split mold; and a second rear split mold disposed behind the second split mold. The second end of the core mold rod may be connected to the second front split mold, the pressure-reducing elastic member may be interposed between the first split mold and the second front split mold, and the core-back suppression cylinder may be connected to the first split mold and the second rear split mold.

The second mold unit may further include: a core-back correction module connected to the first split mold and the second rear split mold, and providing elastic force to the first split mold. The elastic force provided by the core-back correction module may be greater than the elastic force provided by the pressure-reducing elastic member.

The stop unit may further include at least one core-back suppression cylinder connected to the first split mold and the second split mold.

the second mold unit may comprise a first split mold in which a core mold having the second molding surface is slidably coupled; a second split mold disposed behind the first split mold; a core mold rod with a first end thereof is connected to the core mold and a second end thereof is connected to the second split mold, and a pusher that retracts, in a state in which the first mold unit and the second mold unit are combined, the core mold by a core-back distance by which the second split mold is retracted from the first split mold.

The molten resin may contain a foaming agent.

In order to achieve the above objective, according to an embodiment of the present disclosure, there is provided a method for manufacturing automotive interior materials using the apparatus for manufacturing automotive interior materials. The method includes: setting the skin on the first molding surface of the first mold unit; bringing the edge of the edge portion of the set skin into full contact with the first molding surface by pressurizing a tip of the tip portion of the sealing block; and combining the first mold unit and the second mold unit; forming, as a result of the combining, the enclosed molding space between the first molding surface and the second molding surface by closing the opening with the wrapping molding surface of the sealing block, wherein the opening is provided along the periphery between the first molding surface and the second molding surface to expose the edge of the skin; molding the base material that is integrated with the skin in the enclosed molding space by injecting molten resin into the enclosed molding space through the gate of the first mold unit; and guiding, by the wrapping molding surface, the edge portion of the skin into a shape that wraps the peripheral portion of the base material.

According to an embodiment of the present disclosure, molding of a base material and wrapping the peripheral portion of the base material with the edge portion of a skin can be accomplished in one step without generating environmental pollutants such as volatile organic compounds (VOCs). Thus, productivity can be greatly improved and manufacturing costs can be greatly reduced.

In addition, in the process of molding a base material by injecting molten resin, the position of a skin is maintained in an accurately fixed state (i.e., the skin is prevented from moving), thereby preventing wrinkles from forming on the skin.

In an apparatus for manufacturing automotive interior materials according to an embodiment of the present disclosure, a sealing block (see 310) is configured (see FIG. 8) to block an opening (see OP) provided when joining a first mold unit (see 100) and a second mold unit (see 200) with a wrapping molding surface of tip portions (see 311, 312), and is configured so that a pressurizing tip presses an entire edge (see 22) of an edge portion of skin when the edge portion (see 21) of the set skin is pressed by the pressurizing tip of the tip portions (see 311, 312) and brought into close contact with a peripheral portion (see 101*b*) of a first molding surface (see 101). At this time, according to the configuration in which the edge of the edge portion of the skin is in close contact with the peripheral portion of the first molding surface, in the process of molding a base material that is integrated with the skin, when the peripheral portion of the base material is wrapped with the edge portion of the skin using the wrapping molding surface of the sealing block, there is almost no excess portion of the edge portion of the skin that surrounds the base material. Thus, there is no need to take a step of cutting off the excess portion of the edge portion of the skin that surrounds the base material and excluding the excess portion from the interior material, and a post-processing step of collecting the excess portion after cutting, etc. Consequently, automotive interior materials can be manufactured through a more simplified process, thereby significantly reducing the cost required to manufacture automotive interior materials.

According to an embodiment of the present disclosure, during the injection process of molten resin, damage to the back surface of a skin due to the injection pressure of the molten resin can be minimized by injecting molten resin at a location away from the skin.

In addition, since mold parts on opposite sides are separated from each other by a small distance (core back) after injection and compression of molten resin, damage to the skin (deterioration, hardening of a foam layer on the back, etc.) caused by high pressure and temperature in the molding space can be prevented, and if the molten resin contains a foaming agent, foaming can be clearly induced.

According to an embodiment of the present disclosure, the retraction distance of a second split mold with respect to a first split mold can be limited by adjusting the movement distance (controlling the transition between released and fixed states) of a core-back suppression cylinder (see 270) connected to the first split mold (see 210) and the second split mold (see 220 and 230) of the second mold unit (see 200). In a core-back state, the movement of a mold is limited by the core-back suppression cylinder, so the core-back distance can be stably and accurately maintained at the required level, and thus the compressed skin can be more accurately restored to the required shape. That is, due to the core-back suppression cylinder, in order to accurately restore the skin, the second split mold that has retracted by the core-back distance can be suppressed from further retracting by adjusting the movement distance of the core-back suppression cylinder (adjusting the travel distance of a cylinder rod by controlling the transition between the released and fixed states). Furthermore, depending on the process conditions, such as the material of the skin, the core-back suppression cylinder can also be involved in precise control of the core-back distance according to the retraction of the second split mold.

The advantageous effects are not limited to this, and other effects not mentioned can be clearly understood by those skilled in the art from the present specification and the attached drawings.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
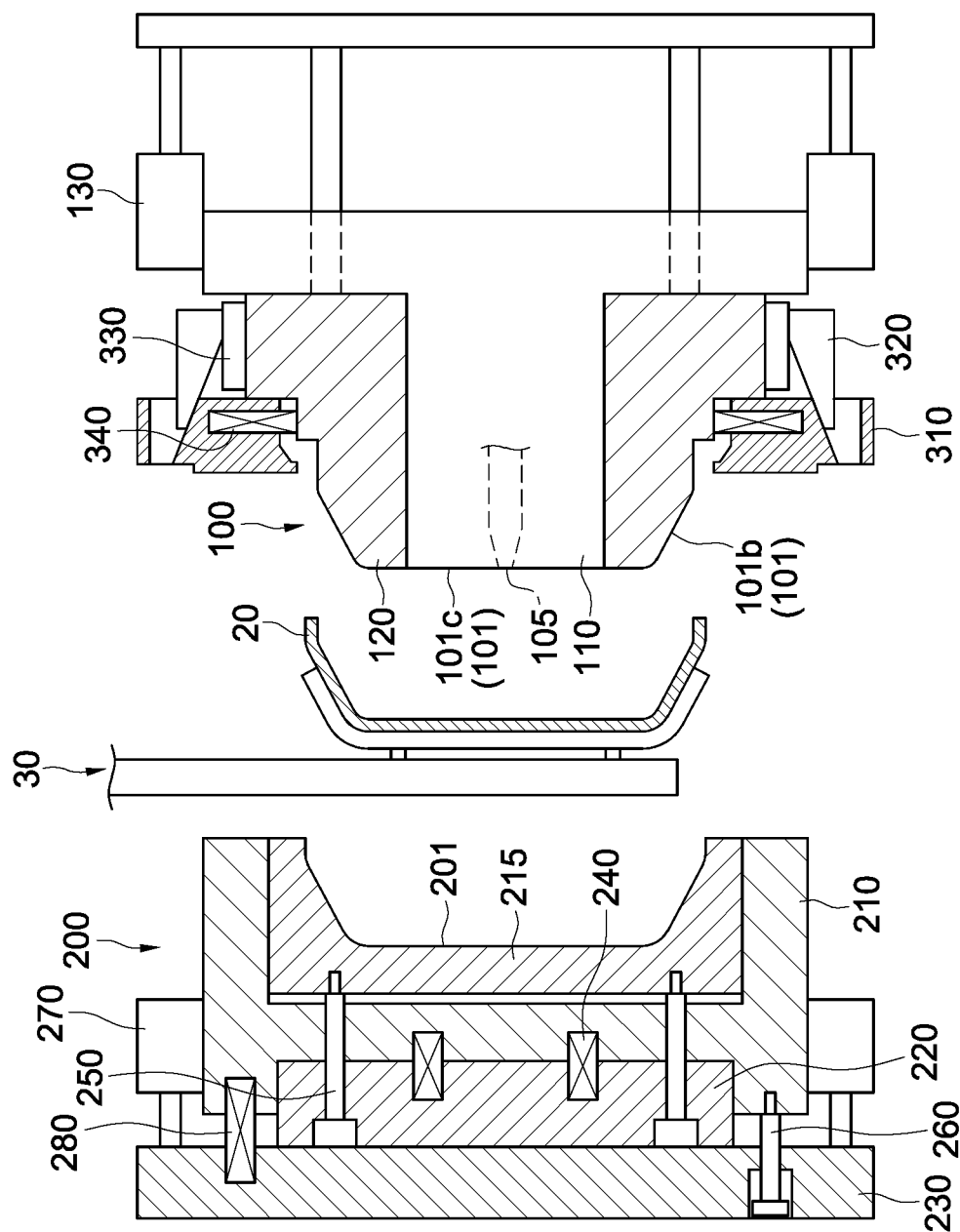
FIG. 1 shows the configuration of an apparatus for manufacturing automotive interior materials according to the first embodiment of the present disclosure.

Hereinafter, embodiments of the present disclosure are described in detail with reference to the accompanying drawings to enable those skilled in the art to easily implement the present disclosure. However, it is important to note that the present disclosure may be embodied in many different forms and is not limited to the embodiments described herein.

When describing the embodiments of the present disclosure, if it is determined that a detailed description of a known related function or configuration may unnecessarily obscure the subject matter of the present disclosure, the specific description will be omitted, and parts with similar functions and actions will be denoted by the same reference numerals throughout the drawings.

Since at least some of the tams used in the specification are defined in consideration of functions within the present disclosure, they may vary according to user, operator intention, custom, and the like. Therefore, the terms should be interpreted based on the context provided throughout the specification. In addition, in this specification, the inclusion of a certain component implies that other components may also be included, unless explicitly stated otherwise. Additionally, when a part is said to be connected (or coupled) with another part, this includes not only the case of being directly connected (or coupled), but also the case of being indirectly connected (or coupled) with another part in between.

Meanwhile, in the drawings, the size or shape of components, and thickness of lines may be somewhat exaggerated for convenience of understanding.

An apparatus and method according to an embodiment of the present disclosure may perform insert injection molding for manufacturing automotive interior materials, and provide an automotive interior material including a skin and a base material integrated with the skin by insert injection molding. In addition, in the process of molding the base material by insert injection molding, it is possible to wrap the peripheral portion of the base material with the edge portion of the skin.

An automotive interior material manufactured according to an embodiment of the present disclosure may be used for, for example, armrests, console boxes, crash pads, dashboards, door panels, door trims, glove boxes, headliners, and headrests.

The skin used in manufacturing automotive interior materials according to an embodiment of the present disclosure may consist of a soft skin comprising a skin layer and a foam layer, and may include actual stitches. The foam layer may be positioned between the base material and the skin layer. For clarification, actual stitches may be created through a sewing process using a sewing machine, and similar equipment. The skin used in manufacturing automotive interior materials according to an embodiment of the present disclosure may be preformed beforehand and shaped to a size suitable for wrapping the peripheral portion of the base material with the edge portion of the skin.

The material of the skin layer may be PVC or olefin-based thermoplastic elastomer (TPO), which is a type of thermoplastic elastomer (TPE), and thermoplastic polyurethane (TPU), and the material of the foam layer may be polypropylene foam, polyurethane foam, ethylene vinyl acetate foam, etc., but embodiments of the present disclosure are not limited thereto.

The material of the base material may be acrylonitrile butadiene styrene, acrylonitrile styrene, polyamide, polycarbonate, polyethylene, polyphenylene sulfide, polypropylene, polystyrene, PVC, but embodiments of the present disclosure are not limited thereto.

The configuration and operation of an apparatus for manufacturing automotive interior materials according to the first embodiment of the present disclosure are shown in FIGS. 1 to 10.

Referring to FIGS. 1-4, the apparatus for manufacturing automotive interior materials according to the first embodiment of the present disclosure includes a first mold unit 100 and a second mold unit 200 facing each other. The first mold unit 100 has a first molding surface 101 and a gate 105 disposed on the first molding surface 101, and a skin 20 is set on the first molding surface 101 and may be secured using suction, adhesion, pins, etc. The first molding surface 101 may have a protruding shape. The second mold unit 200 is configured to have a second molding surface 201 facing the first molding surface 101, and to provide, when combined with the first mold unit 100, an opening OP that exposes an edge 22 of an edge portion 21 of the set skin 20 along the periphery between the first molding surface 101 and the second molding surface 201. The second molding surface 201 may be famed concavely to correspond with the first molding surface 101. The second molding surface 201 opposite the first molding surface 101 may support the set skin 20 when the mold is closed by joining the first mold unit 100 and the second mold unit 200.

The position of the first mold unit 100 may be fixed, and the second mold unit 200 may be moved back and forth with respect to the first mold unit 100 by an injection molding machine. Accordingly, the first mold unit 100 and the second mold unit 200 may approach or be spaced apart from each other depending on the moving direction of the second mold unit 200, and may be joined according to the distance at which they approach each other. Alternatively, for the joining process, the second mold unit 200 may be fixed in position, and the first mold unit 100 may be moved forward or backward relative to the second mold unit 200. Of course, for the joining process, it is also possible to configure the first mold unit 100 and the second mold unit 200 to approach or be spaced apart from each other, as needed.

The apparatus for manufacturing automotive interior materials according to the first embodiment of the present disclosure further includes a sealing block 310. The sealing block 310 is configured to have a tip portion consisting of wrapping molding surface 311 and a pressurizing tip 312, and disposed along the opening OP (see FIG. 8) when the first mold unit 100 and the second mold unit 200 are joined. The tip portion of the sealing block 310 is shaped to have: the pressurizing tip 312 that brings the edge 22 of the skin 20 into full contact with the first molding surface 101; and the wrapping molding surface 311 that closes an opening OP to form an enclosed molding space between the first molding surface 101 and the second molding surface 201.

Figure 5:
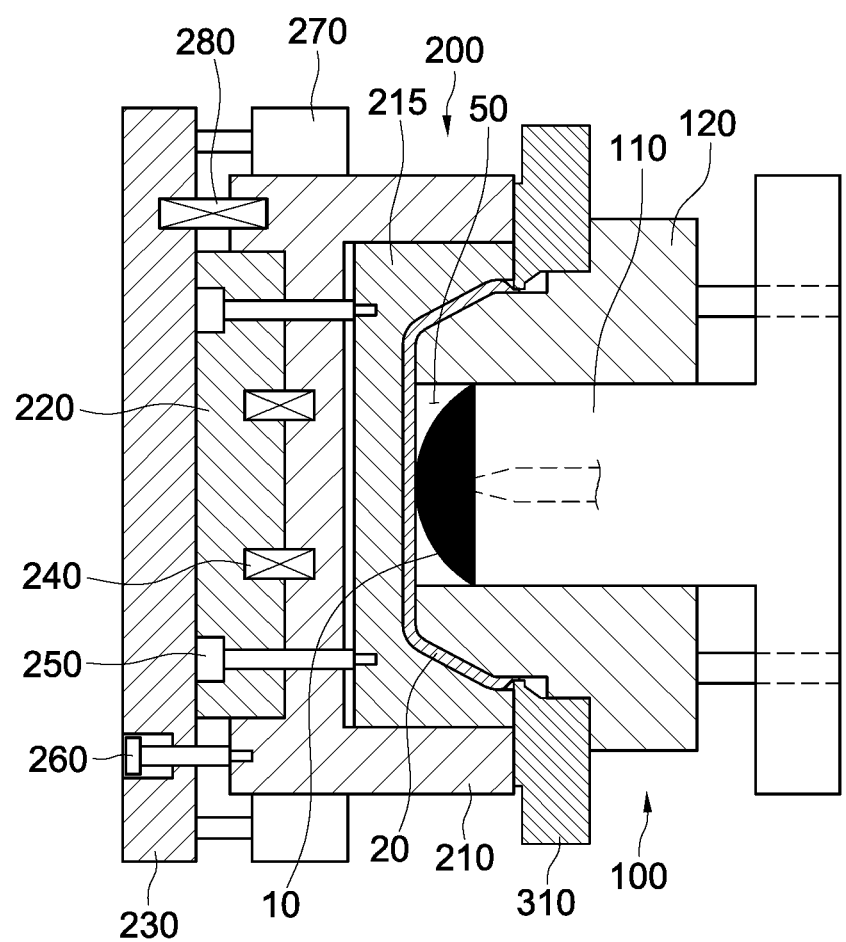
Figure 6:
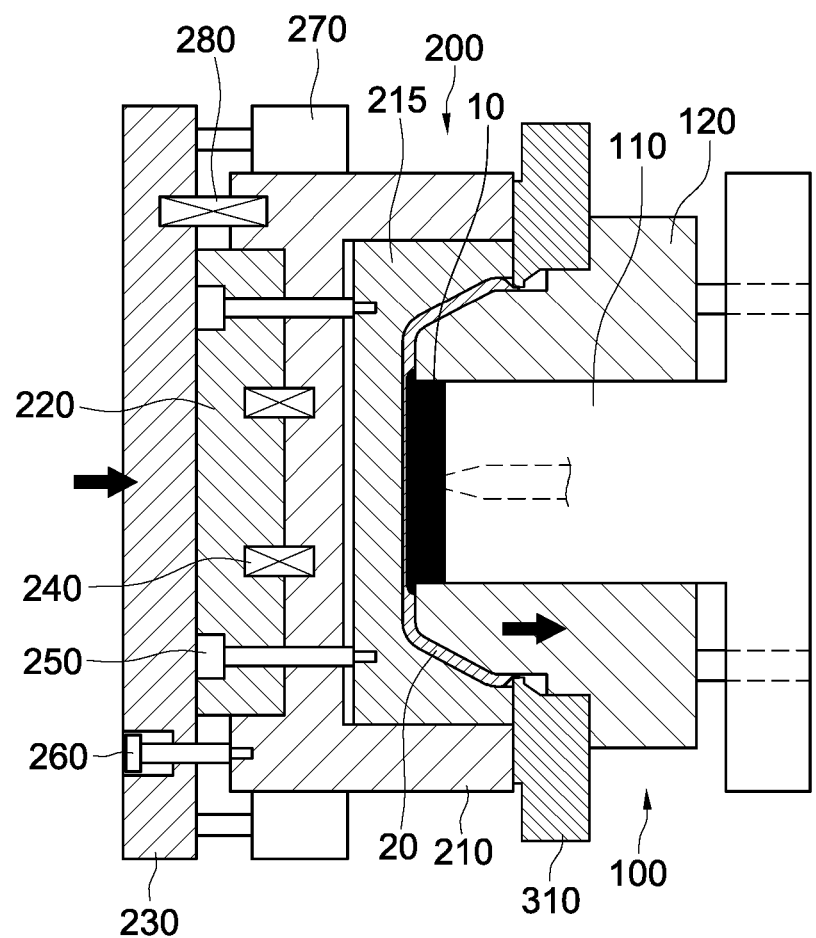
Figure 7:
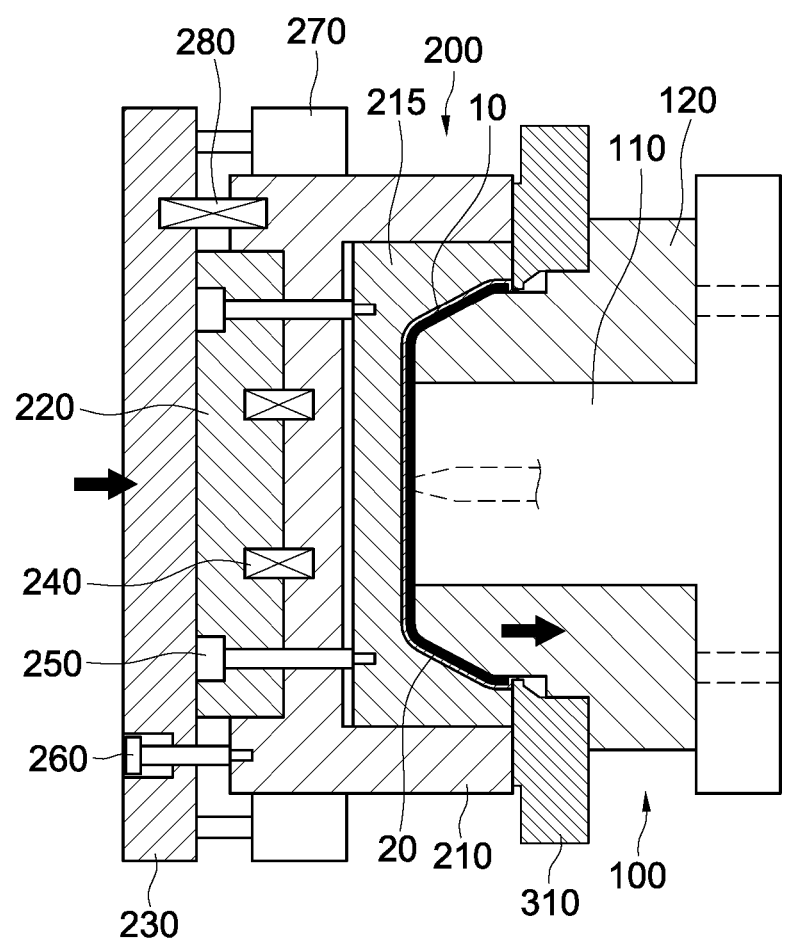

Referring to FIGS. 5-7, molten resin 10 is injected through the gate 105. The molten resin 10 is then molded into a base material integrated with the skin 20 within the enclosed molding space, defined by the first molding surface 101, the second molding surface 201, and the wrapping molding surface 311. In this process, the wrapping molding surface 311 guides the skin 20 into a shape where the edge portion 21 of the skin 20 wraps the peripheral portion of the base material (see FIG. 8). Depending on various implementation conditions, the molten resin 10 may contain a physical or chemical foaming agent.

Referring to FIGS. 1-2, the sealing block 310 is provided in the first mold unit 100. The sealing block 310 is composed of a plurality of unit blocks arranged around the first molding surface 101. Each of the plurality of unit blocks of the sealing block 310 is capable of moving back and forth with respect to an edge section of the first molding surface 101 where the edge of the skin is positioned by block drive modules 320, 330, and 340, thereby pressing the edge 22 of the skin 20 when moving forward and releasing the pressure on the edge 22 of the skin 20 when moving backward. When the unit blocks of the sealing block 310 move forward, the tip portion may approach close to the first molding surface 101 in order to bring the edge 22 of the skin 20 into full contact with the first molding surface 101. Of course, when the unit blocks of the sealing block 310 move backward, the tip portion may be spaced apart from the first molding surface 101.

Figure 2A:
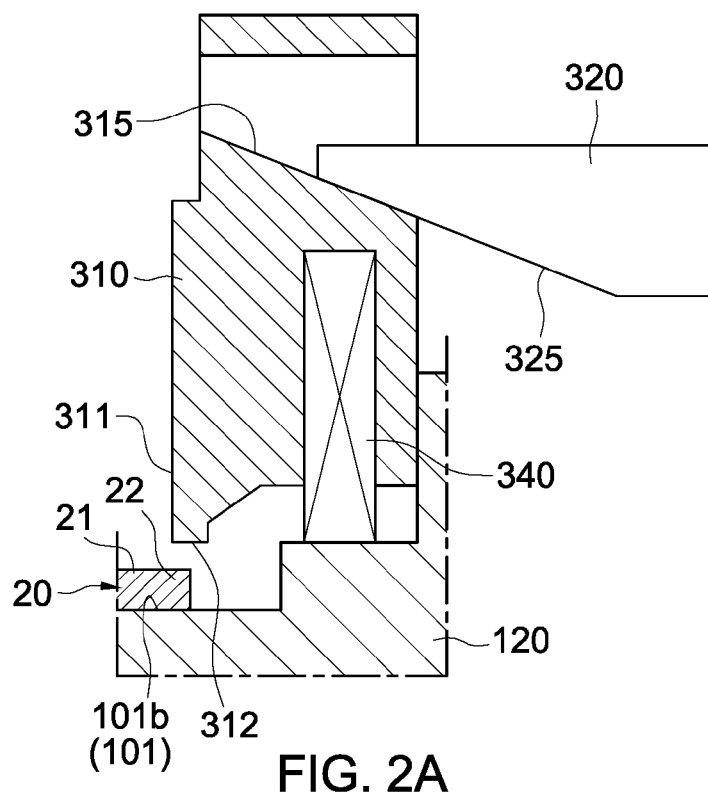
FIGS. 2A to 2B show a close-up view of a sealing block and a peripheral mold according to the first embodiment of the present disclosure.
Figure 2B:
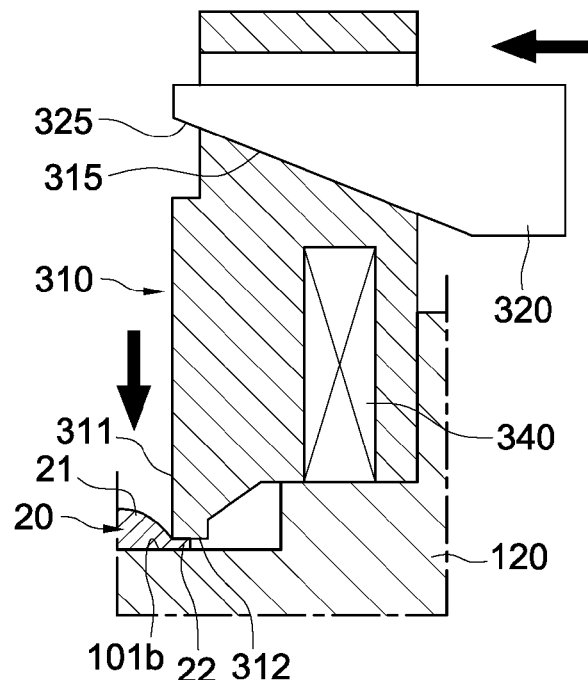
Figure 3:
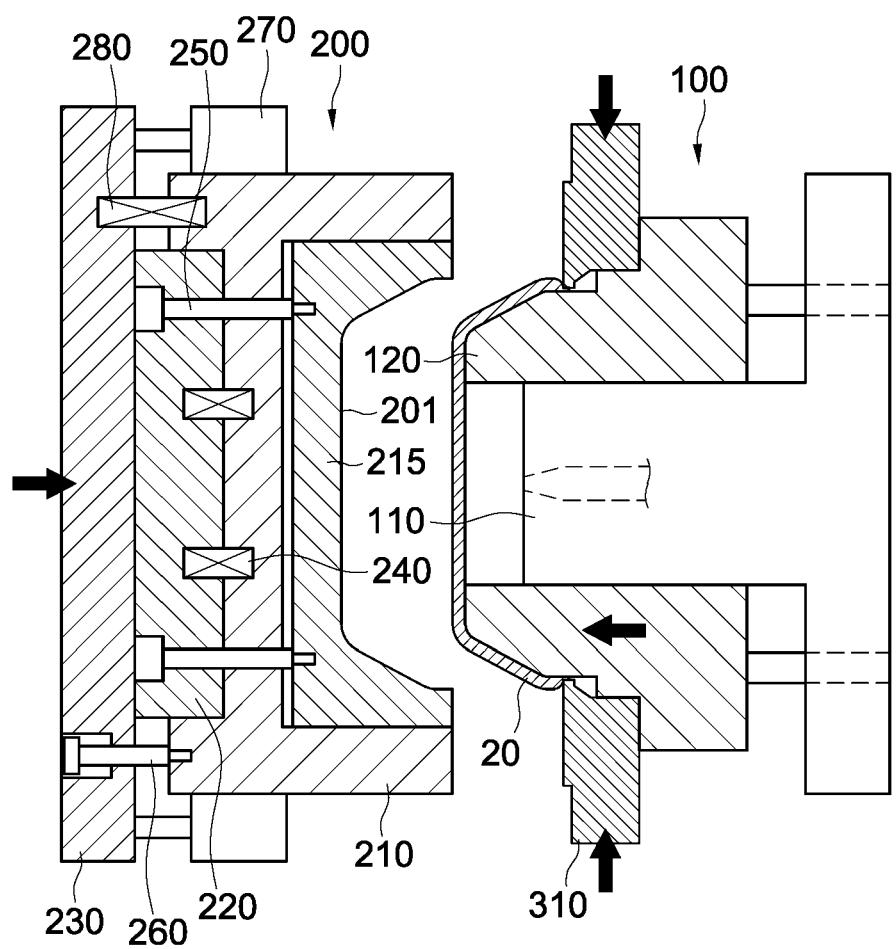
FIGS. 3 to 10 show the operation of the apparatus for manufacturing automotive interior materials according to the first embodiment of the present disclosure.

Referring to FIGS. 2A and 2B, the block drive modules 320, 330, and 340 include a forward operation member 320, a drive source 330, and a backward operation member 340. The forward operation member 320 is capable of moving back and forth with respect to each unit block of the sealing block 310, and are configured to advance the plurality of unit blocks by a tapered surface 325 when moving forward. The drive source 330 moves the forward operation member 320. As an example, the drive source 330 may be a linear actuator. Although not shown, the drive source 330 is connected to the forward operation member 320 through a connecting member connecting the forward operating member 320 and may move the forward operating member 320 simultaneously. The backward operation member 340 provide elastic force in the backward direction with respect to the edge section of the first molding surface 101 where the edge of the skin is positioned to each unit block of the sealing block 310 so as to move the unit blocks backward when the forward operation member 320 moves backward. For example, the backward operation member 340 may be provided between each unit block of the sealing block 310 and a peripheral mold 120 of the first mold unit 100, and may be an elastic member such as springs.

The first mold unit 100 includes: a central mold 110 and the peripheral mold 120 coupled to each other so as to be able to slide back and forth with respect to the second mold unit 200; and a mold drive module 130 that moves the peripheral mold 120. The mold drive module 130 may be configured to move the central mold 110 rather than the peripheral mold 120. The central mold 110 and the peripheral mold 120 are tightly coupled to each other so as to slide back and forth to prevent leakage of the molten resin 10. The central mold 110 is configured to provide a central portion 101*c* of the first molding surface 101 and to have a gate 105. The peripheral mold 120 is configured to provide a peripheral portion 101*b* of the first molding surface 101 around the central mold 110.

The mold drive module 130 may switch the state of the central mold 110 and the peripheral mold 120 between a first state (see FIG. 7) in which the central mold 110 and the peripheral mold 120 are aligned to provide the first molding surface 101 and a second state (see FIGS. 3 and 4) in which the central mold 110 and the peripheral mold 120 are misaligned to provide an injection space surrounded by the peripheral mold 120 in front of the gate 105. The mold drive module 130 may advance the peripheral mold 120 relative to the second mold unit 200 to change the state of the central mold 110 and the peripheral mold 120 from the first state to the second state. The advanced peripheral mold 120 may be pushed and retracted by the second mold unit 200, which is advanced (i.e., moved from the injection position to the compression position) with respect to the first mold unit 100, and thus the state of the central mold 110 and the peripheral mold 120 may be changed from the second state to the first state (see FIGS. 6 and 7). The mold drive module 130 may include a drive cylinder and a relief valve. The drive cylinder may be directly or indirectly connected to the peripheral mold 120. The relief valve may be configured to discharge an amount of fluid corresponding to the excess pressure from the drive cylinder when the pressure acting on the drive cylinder exceeds a predetermined set pressure. Accordingly, the mold drive module 130 may allow the advanced peripheral mold 120 to be pushed back by the second mold unit 200, and the advanced peripheral mold 120 may be constantly retracted at the speed at which the second mold unit 200 pushes.

Figure 8:
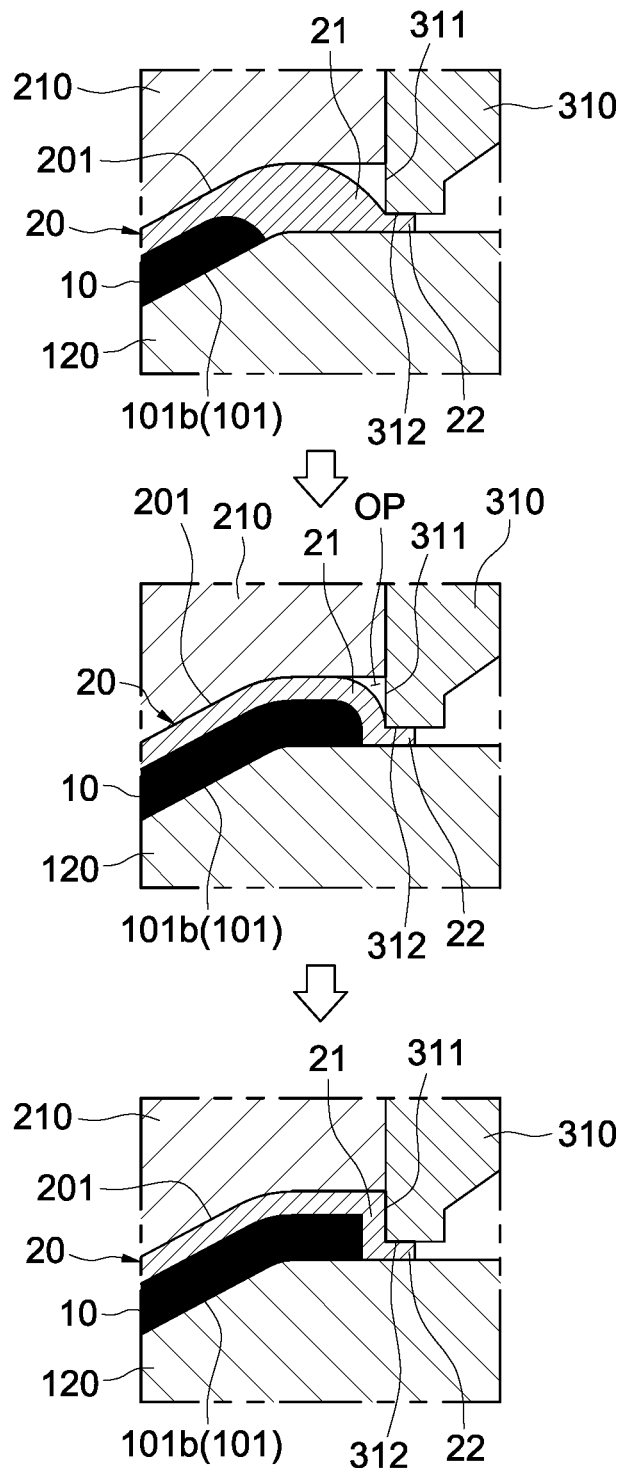

The central mold 110 and the peripheral mold 120 are maintained in the second state that the central portion 101c of the first molding surface 101 and the peripheral portion 101b of the first molding surface are misaligned (see FIGS. 3 and 4) when the molten resin 10 is injected. After the injection of the molten resin 10 is completed, the mold drive module 130 switches the central mold 110 and the peripheral mold 120 to the first state that the central portion 101c of the first molding surface 101 and the peripheral portion 101b of the first molding surface are aligned (see FIG. 7). During this process, the volume of an injection space 50 is reduced, and the injected molten resin 10 in the injection space 50 is compressed (see FIG. 6). Certainly, the molten resin 10 may flow into the molding space (a confined area defined by the first molding surface 101, the second molding surface 201, and the wrapping molding surface 311) from the injection space 50 as the volume of the injection space 50 decreases and fills the molding space (see FIG. 7). In this process, the molten resin 10 is shaped into a base material that is integrated with the skin 20 within the molding space, and the skin 20 is guided into a shape in which the edge portion 21 thereof surrounds the peripheral portion of the base material by the wrapping molding surface 311. FIG. 8 shows the process in which the peripheral portion of the molded base material is wrapped by the edge portion 21 of the skin 20. Referring to FIG. 8, the skin 20 may be compressed by the molten resin 10 entering the molding space, and the edge portion 21 of the skin 20 may be deformed into a shape that adheres to the wrapping molding surface 311 within the molding space so as to wrap around the peripheral portion of the base material.

The second mold unit 200 includes: a first split mold 210 combined with a core mold 215 equipped with a second molding surface 201 to enable the core mold 215 to slide back and forth relative to the first mold unit 100; second split mold comprising a second front split mold 220 and a second rear split mold 230 and disposed behind the first split mold 210; and a core mold rod 250 whose opposite ends are connected to the core mold 215 and the second split mold, respectively. In addition, the second mold unit 200 further includes: at least one pressure-reducing elastic member 240 interposed between the first split mold 210 and the second split mold. The pressure-reducing elastic member 240 is responsible for retracting the core mold 215 by an amount equivalent to the predetermined core-back distance G1 at which the second split mold is retracted from the first split mold 210 under the action of elastic force (see FIG. 9). This occurs when the second mold unit 200 is fully shifted to the compression position (see FIG. 7). The pressure-reducing elastic member 240 may be a spring whose opposite end portions are inserted into a groove formed to face the first split mold 210 and the second split mold. When the pressure-reducing elastic member 240 pushes out the second split mold, the core mold rod 250 retracts together with the second split mold, and the core mold 215 retracts.

After compression of the molten resin 10, when the core mold 215 is retracted by the core-back distance G1, the molding space, formed by the opening OP being closed by the wrapping molding surface 311 of the sealing block 310, between the first molding surface 101 and the second molding surface 201 is expanded, and thus the pressure and temperature in the molding space decrease. At this stage, when the molten resin 10 contains a foaming agent, foaming may occur due to a drop in pressure and temperature in the molding space. Consequently, due to the pressure and temperature drop in the molding space, damage (deterioration, hardening of the foam layer on the back side, etc.) caused by the high temperature of the molten resin 10 may be prevented.

The second split mold includes the second front split mold 220 disposed behind the first split mold 210; and the second rear split mold 230 disposed behind the second split mold 220. Both ends of the core mold rod 250 are fixed to the core mold 215 and the second front split mold 220, respectively. The pressure-reducing elastic member 240 is interposed between the first split mold 210 and the second front split mold 230.

Figure 9:
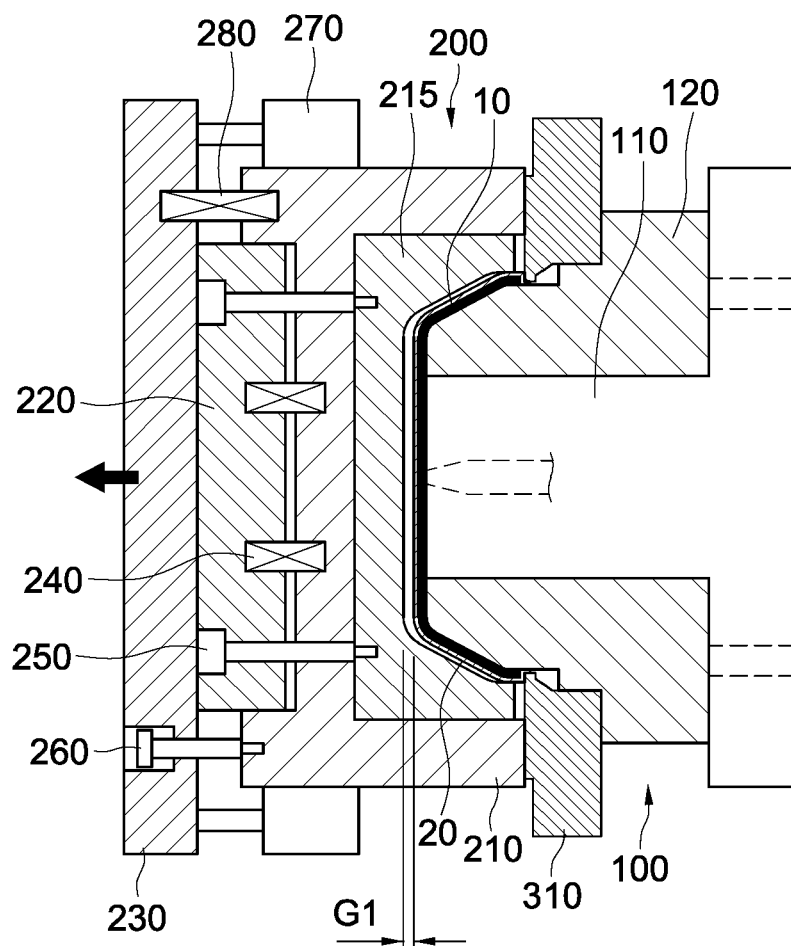
Figure 10:
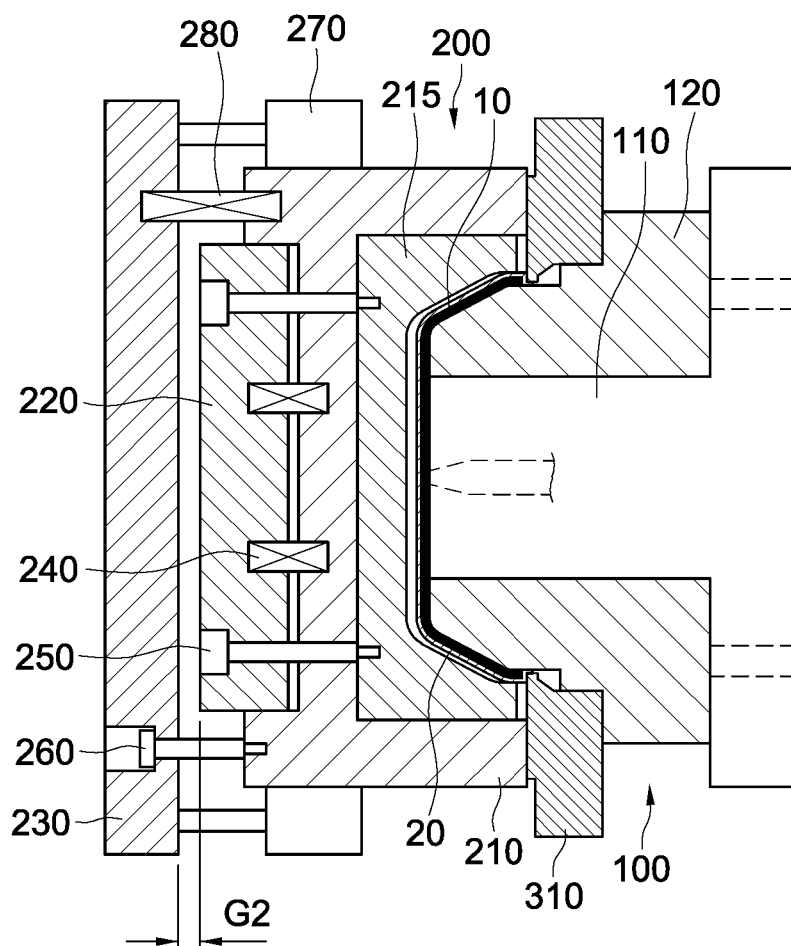
Figure 11A:
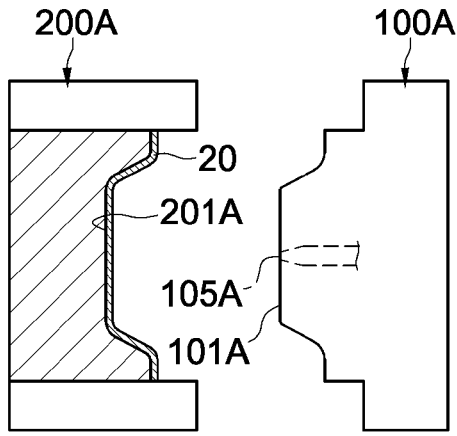
FIGS. 11A to 11F show the configuration and operation of an apparatus for manufacturing automotive interior materials according to the second embodiment of the present disclosure.
Figure 11B:
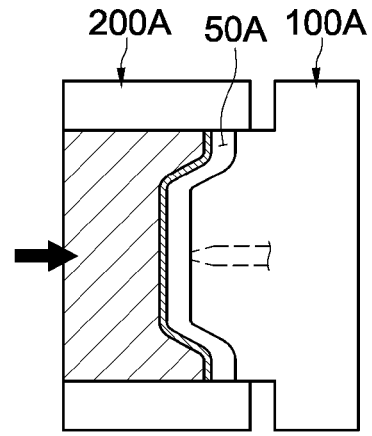
Figure 11C:
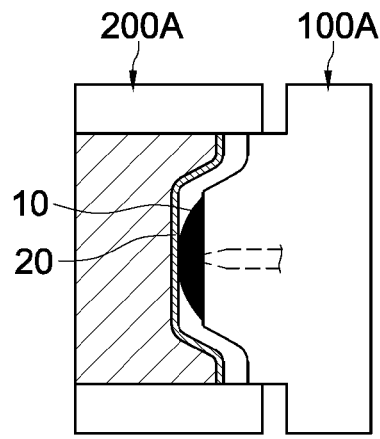
Figure 11D:
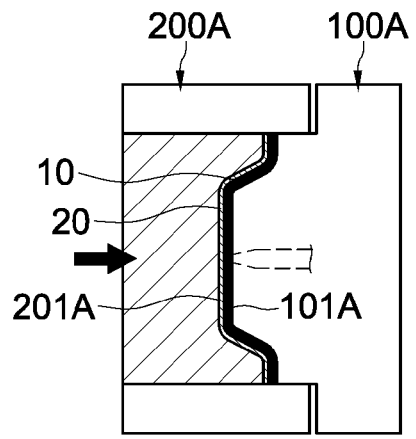
Figure 11E:
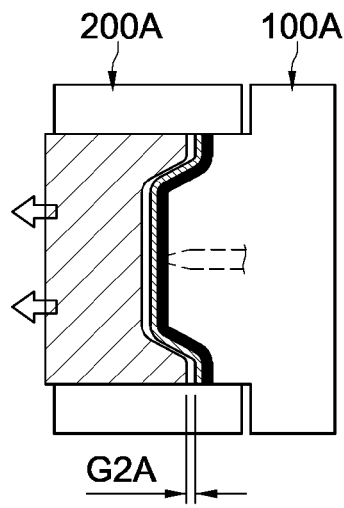
Figure 11F:
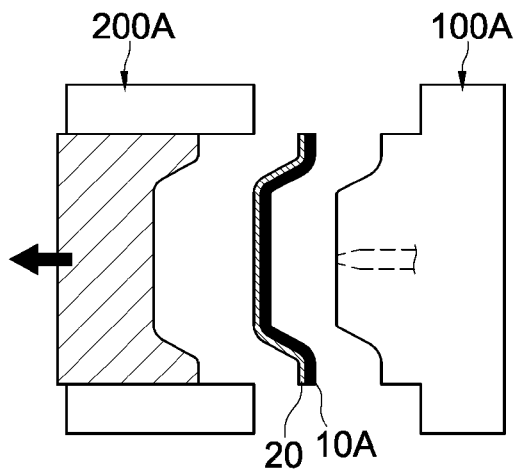
Figure 12A:
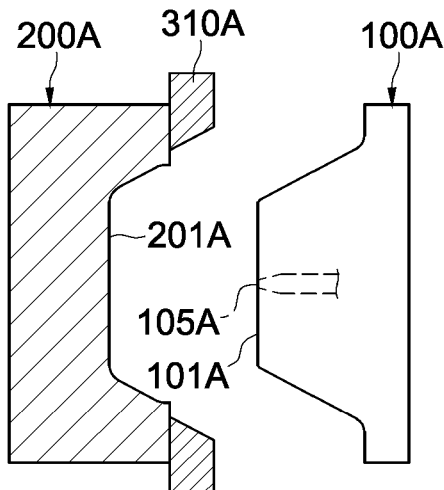
FIGS. 12A to 12D show the configuration and operation of an apparatus for manufacturing automotive interior materials according to the third embodiment of the present disclosure.
Figure 12B:
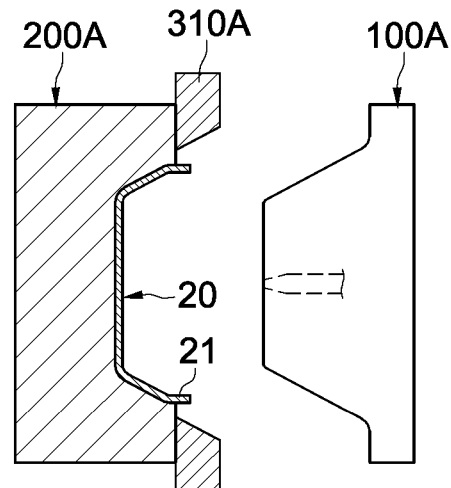
Figure 12C:
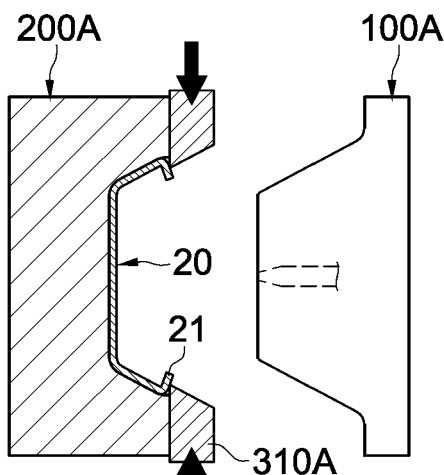
Figure 12D:
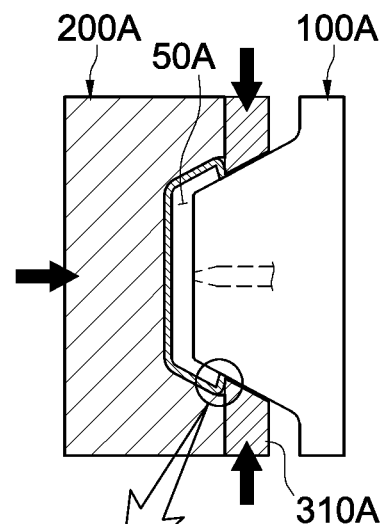
Figure 12D:
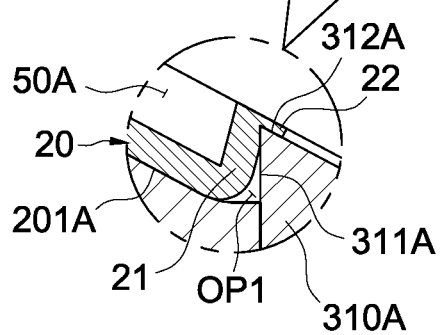

Referring to FIGS. 9 and 10, the core-back deviation correction module 260 may be composed of a bolt installed in the first split mold 210 and a bolt sliding groove formed in the second rear split mold 230. The shaft portion of the bolt is fastened to the first split mold 210. The stepped head of the bolt is disposed in the bolt sliding groove of the second rear split mold 230, and may be caught on a locking protrusion of the bolt sliding groove as the second rear split mold 230 moves. According to the configuration in which the second split mold is divided into the second front split mold 220 and the second rear split mold 230, the deviation of the core-back distance G1 due to the injection molding machine may be controlled. In order for the injection molding machine to accommodate the excess core-back distance of the second mold unit 200 larger than the core-back distance G1, the second rear split mold 230 may be spaced apart by a small distance G2 from the second front split mold 220. For instance, the small distance may be about 5 mm, and the core-back deviation correction module 260 may allow the second rear split mold 230 to retract by this small distance.

The second mold unit 200 may further include a stop unit that limits the retraction distance of the second split mold with respect to the first split mold 210. The stop unit may include at least one core-back suppression cylinder 270 connected to the first split mold 210 and the second rear split mold 230. When the excess core-back distance is absorbed by the core-back deviation correction module 260, the core-back suppression cylinder 270 is activated to switch from the released state to the fixed state, preventing the second rear split mold 230 from retracting further due to remaining pressure, etc., of the injection molding machine. This ensures the precise maintenance of the core-back distance G1 at the required level, and accordingly, the compressed skin 20 may be more accurately restored to the required form.

Meanwhile, the core-back suppression cylinder 270 may be used as a pusher to retract the core mold 215 by the distance of the core-back G1 by which the second split mold is retracted with respect to the first split mold 210. Accordingly, depending on the implementation conditions, etc., except for the pressure-reducing elastic member 240, retracting the core mold 215 by the core-back G1 distance and limiting the retraction distance of the second split mold may be implemented by the core-back suppression cylinder 270.

Referring to FIGS. 9 and 10, the second mold unit 200 may further include a core-back correction module 280 connected to the first split mold 210 and the second rear split mold 230. The core-back correction module 280 is configured to provide elastic force to the first split mold 210. The core-back correction module 280 may include at least one elastic member, such as a spring, whose opposite end portions are supported by the first split mold 210 and the second rear split mold 230, respectively. The core-back correction module 280 suppresses the retraction of the first split mold 210 by pressing the first split mold 210 with elastic force, preventing the core mold 215 from retracting beyond the core-back distance G1 in the process of retracting the core mold 215 by the core-back distance G1 and/or in the process of allowing the core-back deviation correction module 260 to retract the second rear split mold 230 by the small distance G2. As an example, the core-back correction module 280 may be configured to provide greater elastic force than the pressure-reducing elastic member 240.

As described above, in the apparatus for manufacturing automotive interior materials according to the first embodiment of the present disclosure, the first mold unit 100 is configured to have the central mold 110 and the peripheral mold 120 that are slidably coupled to each other, and to switch the combined state of the central mold 110 and the peripheral mold 120 between different first and second states. Of the two states, the second state is a state in which the injection space 50 surrounded by the peripheral mold 120 is provided in front of the gate 105 of the central mold 110 (see FIGS. 4 and 5). The injection space 50 is provided at the front of the first mold unit 100 to communicate with the molding space between the first molding surface 101 and the second molding surface 201 when the first mold unit 100 and the second mold unit 200 are combined. The first state is a state in which the volume of the provided injection space is reduced (see FIGS. 6 and 7).

In the first mold unit 100, when the molten resin 10 is injected through the gate 105, the state of the central mold 110 and the peripheral mold 120 is maintained in the second state providing the injection space 50 of a predetermined volume, so that the molten resin 10 is introduced into the injection space (see FIG. 5), and afterwards, when the injection of the molten resin is completed, the state of the central mold 110 and the peripheral mold 120 is converted from the second state to the first state, so that, by reducing the volume of the injection space, the molten resin 10 in the injection space 50 is introduced into the molding space between the first molding surface 101 and the second molding surface 201 and compressed (see FIGS. 6 and 7). In this way, the entire amount of molten resin 10 is not introduced into the molding space immediately after being injected, that is, since the injected molten resin 10 is introduced into the expanded injection space 50 from the gate 105 and stays within the injection space 50 for a predetermined time before being introduced into the molding space between the first molding surface 101 and the second molding surface 201, it is possible to suppress the occurrence of defects in which the skin 20 is damaged (deterioration, hardening of the foam layer on the back side, etc.) due to high temperature and/or high pressure caused by the molten resin 10.

An automotive interior material may be manufactured by the apparatus for manufacturing automotive interior materials according to the first embodiment of the present disclosure as follows.

First, a preformed skin 20 is mounted on the first molding surface 101 so that the skin 20 is set on the first molding surface 101. For mounting the skin 20, a skin transport unit 30 that inserts the skin 20 between the first mold unit 100 and the second mold unit 200 may be used.

Then, the edge 22 of the edge portion 21 of the set skin 20 is entirely brought into close contact with the first molding surface 101 by a pressurizing tip 312 of the sealing block 310. The peripheral mold 120 of the first mold unit 100 is advanced toward the second mold unit 200 to maintain the central mold 110 and the peripheral mold 120 in the second state. At this time, an injection space 50 is formed in front of the gate 105 of the central mold 110.

Figure 4:
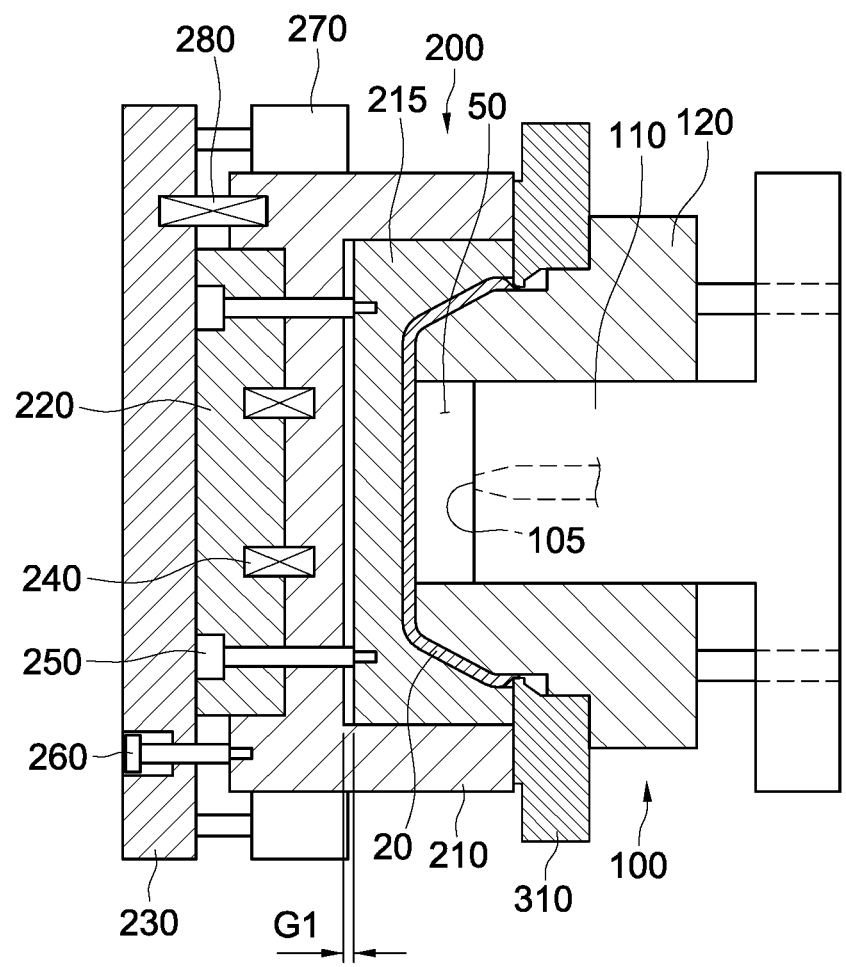

Next, the first mold unit 100 and the second mold unit 200 are joined. That is, as shown in FIG. 4, the second mold unit 200 is moved to the injection position by the injection molding machine. At this time, due to the joining of the first mold unit 100 and the second mold unit 200, the skin 20 is supported by the first molding surface 101 of the first mold unit 100 and the second molding surface 201 of the second mold unit 200, and the opening OP exposing the edge 22 of the skin 20 is closed by the wrapping molding surface 311 of the sealing block 310. Accordingly, a molding space is formed between the first molding surface 101 and the second molding surface 201. For joining of the first mold unit 100 and the second mold unit 200, the second rear split mold 230 is advanced. As a result, the first split mold 210 and the second front split mold 220 are also advanced. At this time, the first split mold 210, the second front split mold 220, and the second rear split mold 230 may be in close contact with each other. The first split mold 210 and the second front split mold 220 are spaced apart front and back from each other by the core-back distance G1. If necessary, the core-back suppression cylinder 270 is operated from the released state to the fixed state, so that the first split mold 210 and the second front split mold 220 may be more stably maintained spaced apart from each other by the core-back distance G1.

Next, the molten resin 10 is injected through the gate 105. At this time, depending on implementation conditions, etc., a foaming agent may be included in the molten resin 10.

When the injection of the molten resin 10 is completed, the second mold unit 200 is advanced by the injection molding machine and moved to the injection position. Then, the peripheral mold 120 of the first mold unit 100 is pushed and retracted by the second mold unit 200, and the state of the central mold 110 and the peripheral mold 120 change from the second state to the first state. In this process, the injection space 50 is reduced in volume, the injected resin is compressed as the volume of the injection space 50 is reduced, and enters and fills the molding space and is molded into the base material. In addition, the peripheral portion of the molded substrate is wrapped with the edge portion of the skin 20. Depending on the implementation conditions, etc., the core-back suppression cylinder 270 operated in a fixed state during the injection process of the molten resin 10 may be maintained in a released state during the compression process of the injected molten resin 10.

Next, after completion of compression of the molten resin 10, the second rear split mold 230 is retracted by the core-back distance G1 to retract the core mold 215. At this time, when the molten resin 10 contains a foaming agent, foaming may occur. In addition, as the pressure and temperature of the molding space decrease, damage to the skin 20 due to the high temperature of the molten resin 10 may be prevented. Furthermore, the compressed skin 20 may be more accurately restored to the required form.

When the injection molding machine retracts the second mold unit 200 beyond the core-back distance G1, as shown in FIG. 10, the second rear split mold 230 is independently retracted within the range of a predetermined distance G2 and is spaced apart from the second front split mold 220. In this process, the core-back correction module 280 may provide elastic force to the first split mold 210 in the forward direction to limit the retraction of the first split mold 210, and the core-back suppression cylinder 270 is operated to switch to the fixed state from the released state to actively prevent the second rear split mold 230 from retracting further. Accordingly, the core-back distance G1 may be stably and accurately maintained.

Finally, the first mold unit 100 and the second mold unit 200 may be completely opened, and the molded product, that is the base material with the skin 10 integrated, may be taken out.

FIGS. 11A to 11F show the configuration and operation of an apparatus for manufacturing automotive interior materials according to the second embodiment of the present disclosure.

According to the second embodiment shown in FIGS. 11A to 11F, the skin 20 may be set on a first molding surface 101A while being mounted on a second molding surface 201A of a second mold unit 200A, the sealing block 310 of the first embodiment may not be applied, an injection space 50A may be provided by adjusting the gap between the first molding surface 101A of a first mold unit 100A and the second molding surface 201A of the second mold unit 200A.

According to the second embodiment of the present disclosure, the second mold unit 200A is advanced to the injection position to form the injection space 50A, and then molten resin 10 is injected through a gate 105A. Then, when the injection of the molten resin 10 is completed, the second mold unit 200A is further advanced to the compression position to compress the molten resin 10 in the injection space 50A. At this time, the volume of the injection space 50A is reduced. Accordingly, the injection space 50A may be volume variable. When the compression of the molten resin 10 is completed, the second mold unit 200A is moved backwards by a predetermined distance G2A. Reference numeral 10A is a molded base material.

FIGS. 12A to 12D show the configuration and operation of an apparatus for manufacturing automotive interior materials according to the third embodiment of the present disclosure.

According to the third embodiment shown in FIGS. 12A to 12D, the skin 20 may be set on the first molding surface 101A with the skin 20 mounted on the second molding surface 201A, a sealing block 310A may be provided in the second mold unit 200A, the edge portion 21 of the skin 20 may be transformed into a wrapping-like shape in advance by the sealing block 310A, and the compression process for the injected molten resin may be omitted by maintaining the injection space (cavity) 50A without changing the volume.

According to the third embodiment of the present disclosure, after the skin 20 is mounted, each of the plurality of unit blocks of the sealing block 310A is advanced to push the edge portion 21 of the skin 20 entirely inward, so that the edge portion 21 of the skin 20 is transformed into a wrapping-like shape (a shape bent inward). Then, the second mold unit 200A is advanced to the injection position and each of the plurality of unit blocks of the sealing block 310A is further advanced. At this time, the injection space 50A is formed, the edge 22 of the skin 20 is entirely in close contact with the first molding surface 101A by a pressurizing tip 312A, and an opening OP1 is closed by a wrapping molding surface 311A. Then, the molten resin 10 is injected through the gate 105A. When the injection of the molten resin 10 is completed, the second mold unit 200A may be retracted a predetermined distance for core back operation without compressing the injected molten resin 10.

Although the present disclosure has been described above, the present disclosure is not limited to the disclosed embodiments and the accompanying drawings, and various modifications may be made by those skilled in the art without departing from the technical spirit of the present disclosure. In addition, the technical ideas described in the embodiments of the present disclosure may be implemented independently or in combination of two or more.

DESCRIPTION OF NUMERALS

10: molten resin, 20: skin, 21: edge portion, 30: skin transport unit, 50 injection space, 100: first mold unit, 101: first molding surface, 105: gate, 110: central mold, 120: peripheral mold, 200: second mold unit, 201: second molding surface, 210: first split mold, 215: core mold, 220: second front split mold, 230: second rear split mold, 240: pressure-reducing elastic member, 250: core mold rod, 260: core-back deviation correction module, 270: core-back suppression cylinder, 280: core-back correction module, 310: sealing block, 311: wrapping molding surface, 312: pressurizing tip, 320: forward operation member, 330: drive source, 340: backward operation member.

What is claimed is:

1. An apparatus for manufacturing automotive interior materials, the apparatus comprising:
    a first mold unit provided with a first molding surface and a gate disposed on the first molding surface, wherein a skin is set on the first molding surface;
    a second mold unit provided with a second molding surface facing the first molding surface, and configured to provide an opening exposing an edge of an edge portion of the set skin along a periphery between the first molding surface and the second molding surface when the second mold unit is combined with the first mold unit; and
    a sealing block provided with a tip portion disposed along the opening when the first mold unit and the second mold unit are combined,
    wherein the tip portion comprises:
    a pressurizing tip that presses the edge portion to bring the edge of the skin into full contact with the first molding surface; and
    a wrapping molding surface that closes the opening to form an enclosed molding space between the first molding surface and the second molding surface,
    wherein the enclosed molding space is configured to shape a molten resin injected through the gate into a base material, and integrate the base material with the skin; and
    the wrapping molding surface is configured to guide the skin to wrap a peripheral portion of the base material.

2. The apparatus of claim 1, wherein the sealing block is provided in the first mold unit and composed of a plurality of unit blocks arranged around the first molding surface,
    wherein each of the plurality of unit blocks is capable of moving back and forth with respect to an edge section of the first molding surface where the edge of the skin is positioned by a block drive module, thereby pressing the edge of the skin when moving forward and releasing pressure on the edge of the skin when moving backward.

3. The apparatus of claim 2, wherein the block drive module comprises:
    a forward operation member capable of moving back and forth with respect to each of the plurality of unit blocks, and advancing each of the plurality of unit blocks toward the edge section by a tapered surface when moving forward; and
    a backward operation member providing elastic force in a backward direction to each of the plurality of unit blocks so as to move each of the plurality of unit blocks away from the edge section when the forward operation member moves backward.

4. The apparatus of claim 1, wherein the first mold unit comprises:
a central mold and a peripheral mold coupled to each other to enable sliding back and forth with respect to the second mold unit; and
a mold drive module that moves the central mold or the peripheral mold,
wherein the central mold provides a central portion of the first molding surface and has the gate,
the peripheral mold provides a peripheral portion of the first molding surface around the central mold,
the mold drive module switches a state of the central mold and the peripheral mold between a first state, in which the central mold and the peripheral mold are aligned to provide the first molding surface, and a second state, in which the central mold and the peripheral mold are misaligned to provide an injection space surrounded by the peripheral mold in front of the gate, and
the central mold and the peripheral mold remain in the second state when the molten resin is injected, and after an injection of the molten resin is completed, the central mold and the peripheral mold are switched to the first state, reducing the injection space and compressing the injected molten resin in the injection space.

5. The apparatus of claim 1, wherein the second mold unit comprises:
a first split mold in which a core mold having the second molding surface is slidably coupled;
a second split mold disposed behind the first split mold;
a core mold rod with a first end thereof is connected to the core mold and a second end thereof is connected to the second split mold; and
at least one pressure-reducing elastic member interposed between the first split mold and the second split mold, and retracting, in a state in which the first mold unit and the second mold unit are combined, the core mold by a core-back distance by which the second split mold is retracted from the first split mold.

6. The apparatus of claim 5, wherein the second mold unit further comprises:
a stop unit that limits a retraction distance of the second split mold with respect to the first split mold.

7. The apparatus of claim 6, wherein the stop unit includes at least one core-back suppression cylinder connected to the first split mold and the second split mold.

8. The apparatus of claim 6, wherein the second split mold comprises:
a second front split mold disposed behind the first split mold; and
a second rear split mold disposed behind the second split mold,
wherein the second end of the core mold rod is connected to the second front split mold, the pressure-reducing elastic member is interposed between the first split mold and the second front split mold, and the stop unit includes at least one core-back suppression cylinder connected to the first split mold and the second rear split mold.

9. The apparatus of claim 8, wherein the second mold unit further comprises:
a core-back correction module connected to the first split mold and the second rear split mold, and providing elastic force to the first split mold.

10. The apparatus of claim 1, wherein the second mold unit comprises:
a first split mold in which a core mold having the second molding surface is slidably coupled;
a second split mold disposed behind the first split mold;
a core mold rod with a first end thereof is connected to the core mold and a second end thereof is connected to the second split mold, and
a pusher that retracts, in a state in which the first mold unit and the second mold unit are combined, the core mold by a core-back distance by which the second split mold is retracted from the first split mold.

11. The apparatus of claim 5, wherein the molten resin contains a foaming agent.

12. The apparatus of claim 3, wherein the backward operation member is composed of an elastic member positioned between each of the plurality of unit blocks and the first mold unit.

13. A method of using the apparatus for manufacturing automotive interior materials of claim 1, the method comprising:
setting the skin on the first molding surface of the first mold unit;
bringing the edge of the edge portion of the set skin into full contact with the first molding surface by pressurizing a tip of the tip portion of the sealing block;
combining the first mold unit and the second mold unit;
forming, as a result of the combining, the enclosed molding space between the first molding surface and the second molding surface by closing the opening with the wrapping molding surface of the sealing block, wherein the opening is provided along the periphery between the first molding surface and the second molding surface to expose the edge of the skin;
molding the base material that is integrated with the skin in the enclosed molding space by injecting the molten resin into the enclosed molding space through the gate of the first mold unit; and
guiding, by the wrapping molding surface, the edge portion of the skin into a shape that wraps the peripheral portion of the base material.

* * * * *

UNITED STATES PATENT AND TRADEMARK OFFICE
CERTIFICATE OF CORRECTION

PATENT NO. : 12,415,301 B2  
APPLICATION NO. : 18/492781  
DATED : September 16, 2025  
INVENTOR(S) : Chi Won Yoon Page 1 of 1

It is certified that error appears in the above-identified patent and that said Letters Patent is hereby corrected as shown below:

On the Title Page

Please add Item (30) Foreign Application Priority Data  
November 10, 2022 (KR).............. 10-2022-0149944

Signed and Sealed this  
Twenty-eighth Day of October, 2025

John A. Squires  
*Director of the United States Patent and Trademark Office*